(12) United States Patent
Saber et al.

(10) Patent No.: US 12,068,645 B2
(45) Date of Patent: Aug. 20, 2024

(54) SYSTEM CONFIGURED TO DELIVER A POLYPHASE CURRENT OF CONSTANT FREQUENCY FROM A SYNCHRONOUS GENERATOR

(71) Applicant: SAFRAN, Paris (FR)

(72) Inventors: Christelle Saber, Moissy-Cramayel (FR); Anthony Gimeno, Moissy-Cramayel (FR); Cyrille Gautier, Moissy-Cramayel (FR); Stephane Petibon, Moissy-Cramayel (FR); Toni Youssef, Moissy-Cramayel (FR)

(73) Assignee: SAFRAN, Paris (FR)

( * ) Notice: Subject to any disclaimer, the term of this patent is extended or adjusted under 35 U.S.C. 154(b) by 416 days.

(21) Appl. No.: 17/437,308

(22) PCT Filed: Mar. 10, 2020

(86) PCT No.: PCT/FR2020/050487
§ 371 (c)(1),
(2) Date: Sep. 8, 2021

(87) PCT Pub. No.: WO2020/183102
PCT Pub. Date: Sep. 17, 2020

(65) Prior Publication Data
US 2022/0181957 A1 Jun. 9, 2022

(30) Foreign Application Priority Data

Mar. 13, 2019 (FR) ...................................... 1902569

(51) Int. Cl.
*H02K 21/12* (2006.01)
*H02M 5/458* (2006.01)
(Continued)

(52) U.S. Cl.
CPC .......... *H02K 21/12* (2013.01); *H02M 5/4585* (2013.01); *H02P 9/102* (2013.01); *H02P 2103/20* (2015.01)

(58) Field of Classification Search
CPC ...... H02K 21/12; H02M 5/4585; H02P 9/102; H02P 2103/20
See application file for complete search history.

(56) References Cited

U.S. PATENT DOCUMENTS

| | | | | |
|---|---|---|---|---|
| 4,152,636 A | * | 5/1979 | Gorden | .................... H02P 9/302 322/73 |
| 4,156,172 A | * | 5/1979 | Hucker | .................. H02K 19/36 322/69 |

(Continued)

FOREIGN PATENT DOCUMENTS

| | | |
|---|---|---|
| EP | 0244186 A2 | 11/1987 |
| EP | 1995860 A2 | 11/2008 |

(Continued)

OTHER PUBLICATIONS

International Search Report received for PCT Patent Application No. PCT/FR2020/050487, mailed on Aug. 6, 2020, 6 pages (2 pages of English Translation and 4 pages of Original Document).

*Primary Examiner* — Forrest M Phillips
(74) *Attorney, Agent, or Firm* — WOMBLE BOND DICKINSON (US) LLP

(57) ABSTRACT

A system configured to deliver as output a polyphase current of constant frequency from a synchronous generator driven at variable speed. The system includes, at the output of the generator, an AC-to-DC active rectifier including one arm per phase of the current, a DC bus and a DC-to-AC inverter for the output including one arm per phase of the current, the inverter or the DC bus including an arm connected to the neutral, each arm including a controllable switch, the system including an electronic control unit driving the rectifier and (Continued)

including means for tracking a voltage for the rectifier and/or the inverter and means for controlling the inverter, the system including an EMC filter including one arm for each phase of the current, each arm including an inductor, a capacitor connected in a bypass downstream of the inductor, the arm connected to the neutral being connected to each bypass.

10 Claims, 2 Drawing Sheets

(51) Int. Cl.
*H02P 9/10* (2006.01)
*H02P 103/20* (2016.01)

(56) References Cited

U.S. PATENT DOCUMENTS

| | | | |
|---|---|---|---|
| 4,622,629 A * | 11/1986 | Glennon | H02P 9/102 363/126 |
| 2009/0206606 A1 * | 8/2009 | Jorgensen | F03D 7/044 290/44 |
| 2014/0175796 A1 * | 6/2014 | Rasmussen | F03D 9/255 307/151 |
| 2017/0063277 A1 * | 3/2017 | Li | H02P 3/26 |
| 2017/0373626 A1 * | 12/2017 | Schnetzka | H03K 17/166 |
| 2018/0043790 A1 * | 2/2018 | Rozman | B60L 15/025 |
| 2018/0097440 A1 * | 4/2018 | Wang | H02M 7/53871 |
| 2022/0038037 A1 * | 2/2022 | Sorkin | H02P 9/102 |

FOREIGN PATENT DOCUMENTS

| | | |
|---|---|---|
| EP | 2157683 A2 | 2/2010 |
| EP | 2980977 A1 | 2/2016 |
| WO | 2006/121425 A2 | 11/2006 |
| WO | WO-2018139172 A1 * | 8/2018 ............. H01L 29/06 |

* cited by examiner

[Fig. 1]
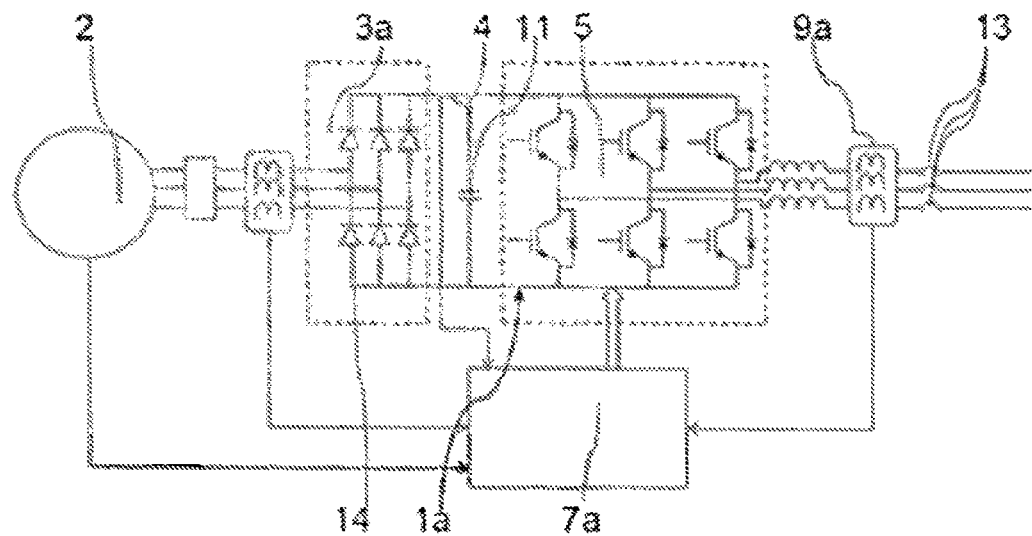
[Fig. 2]
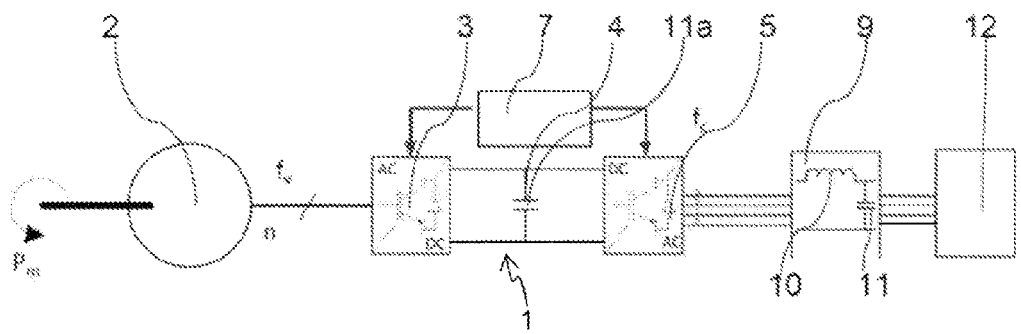

[Fig. 3]
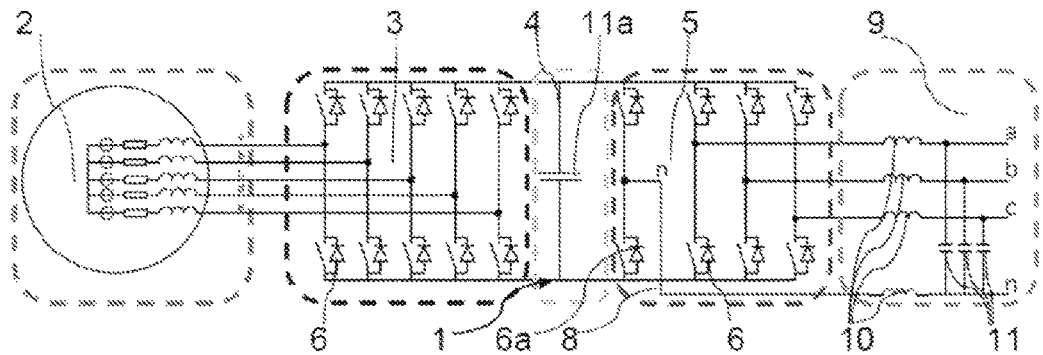
[Fig. 4]
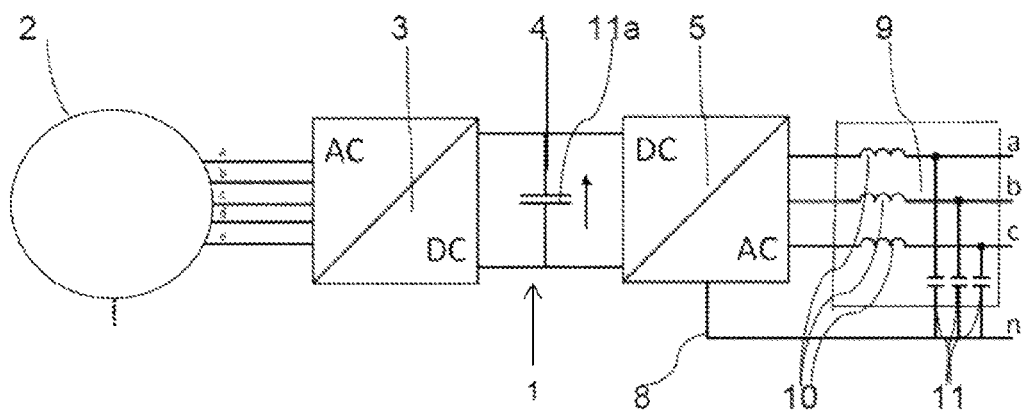
[Fig. 5]
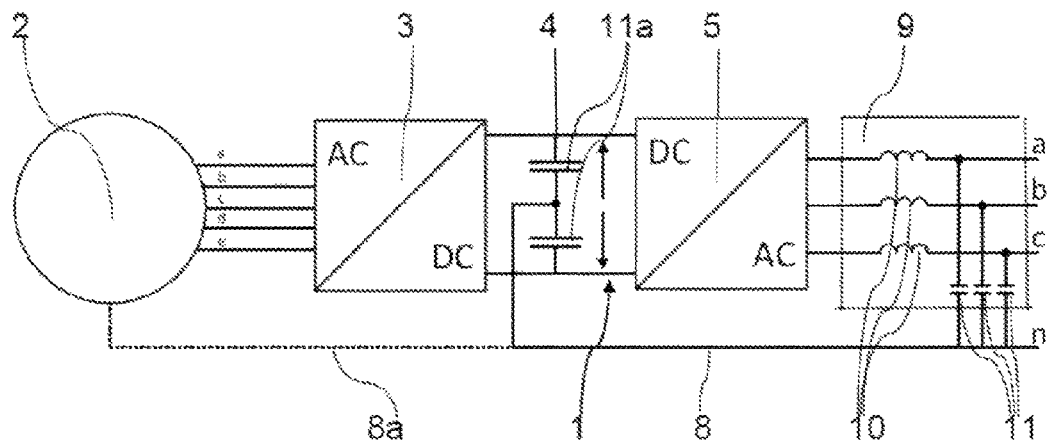

SYSTEM CONFIGURED TO DELIVER A POLYPHASE CURRENT OF CONSTANT FREQUENCY FROM A SYNCHRONOUS GENERATOR

TECHNICAL FIELD OF THE INVENTION

The present invention relates to a fixed-frequency electrical generator via a polyphase synchronous machine at variable speed, in particular, for an aircraft. Such an electrical generator forms a system configured to deliver as output a polyphase voltage of constant frequency from a synchronous machine or generator, for example with permanent magnets, driven at variable speed, and more particularly a constant frequency system for a variable drive speed from a variable generator known by the acronym VSCF (Variable Speed Constant Frequency), in particular in an aircraft.

However, the present invention is applicable to any application of fixed frequency on-board AC power generation from a mechanical shaft at variable speed.

BACKGROUND

The prior art includes, in particular, the patent applications EP-A2-2 157 683, EP-A1-2 980 977, EP-A2-0 244 186, WO-A2-2006/121425 and EP-A2-1 995 860.

A power conversion structure is known to generate a three-phase electrical network plus one phase connected to the neutral at a fixed frequency from a variable speed electrical machine operating as a current generator driven by an accessory gearbox of an aircraft turbojet engine. In particular, such a structure may incorporate a VSCF system.

A VSCF system may, for example, be integrated into an engine nacelle. This VSCF system comprises at least one synchronous generator, means for converting an alternating current into a direct current and then a direct current into an alternating current and an electronic control unit configured to ensure the control of the VSCF system.

The engine nacelle houses an accessory gearbox in the form of a gearbox driving the synchronous generator from the turbojet engine.

A VSCF system allows a constant electrical frequency to be generated via an electrical transformation, as opposed to a mechanical transformation usually used in aeronautics via a constant speed drive equipment known from the prior art as "Constant Speed Drive".

Such an on-board VSCF system is an integrated electromechanical power conversion system capable of replacing some of the generators integrated in aircraft.

FIG. 1 shows a VSCF system 1a known in the prior art. Generally speaking, a VSCF system 1a comprises a permanent magnet synchronous generator 2, a passive rectifier 3a, a DC bus 4, an inverter 5 and an EMC filter 9a arranged at the output of the system 1a.

In FIG. 1, the AC synchronous generator 2 is three-phase. An electronic control unit 7a controls the system 1a by reading the voltages upstream and downstream of the rectifier 3 and the inverter 5 while being fed by the synchronous generator 2.

The alternating current at the output of the permanent magnet synchronous generator is three-phase. A protection device, preferably a fuse, is arranged downstream of the generator in order to separate the generator and the current sensors, each of which is specific to a phase.

The rectifier 3a is passive, since it does not have a controlled switch, but only diodes 14 (of which only one is referenced among all the diodes present). The passive rectifier 3a is coupled at the output to a link capacitor 11 which is part of the DC bus 4 and then to the three-arm inverter 5 which does not have a neutral link. At the output of the inverter 5, the system 1a comprises an EMC filter 9a and voltage sensors for each phase. Each phase line at the output of the system 1a has a switch 13.

A VSCF system of the prior art is advantageously more compact than other equivalent types of system, due to the use of a permanent magnet synchronous generator. In addition, there is no need for an additional device to flux the generator at start-up.

A passive rectifier offers simplified system control. However, a passive rectifier has the disadvantage of delivering a variable voltage to the branch comprising the link capacitor, which can be likened to a DC bus, this voltage being a function of the drive speed of the synchronous generator.

Furthermore, the sizing of the power modules and the capacitor in the DC bus cannot be optimal over the entire operating range of the system.

Furthermore, for a passive rectifier, a defluxing possibility of the synchronous generator is missing.

Finally, the VSCF system of this prior art ensures a unidirectional current flow with operation only in current generator mode by the synchronous generator, and not in energy recovery to the DC bus or the synchronous generator.

It is an objective of the invention, for a system delivering a constant frequency polyphase current from a variable speed driven synchronous generator, to avoid at least in part the above drawbacks.

SUMMARY OF THE INVENTION

To this end, the present invention relates to a system configured to deliver as output a polyphase current of constant frequency from a synchronous generator driven at variable speed, said system successively comprising, at the output of said generator, an AC to DC rectifier, a DC bus and a DC to AC inverter for the output of said system, the output inverter of said system or the DC bus comprising an arm connected to the neutral, said output inverter further comprising one arm per phase of the polyphase AC at the output of said system, said rectifier being an active rectifier comprising at least one arm for each phase of a polyphase current at the output of said generator, each arm comprising at least one controllable switch, said system also comprising an electronic control unit configured to drive said active rectifier with first means for controlling said at least one controllable switch of each arm, said system being remarkable in that the electronic control unit comprises means for monitoring a respective upstream and downstream voltage for the active rectifier and/or for the output inverter of said system and second means for controlling said output inverter, in that each arm per phase of said output inverter comprising at least one controllable switch configured to be driven by the second controlling means of the electronic control unit and in that said system comprises an electromagnetic compatibility filter at the output of the output inverter of said system, said filter comprising an arm for each phase of the polyphase current at the output of said system, each arm of each phase comprising an inductor, a capacitor mounted in a bypass of each arm downstream of said inductor, the arm connected to the neutral being connected to each bypass of the arms of the phases of the EMC filter.

The integrated system provides a fixed frequency electrical generator via a polyphase synchronous machine at variable speed.

The present invention is principally intended for an integrated power supply system for one or a plurality of on-board electrical networks to ensure a fixed frequency of supply current from the variable speed drive of a generator, in particular coupled to a turbomachine shaft, with the additional possibility of regulating the machine by means of a controlled rectifier, which could not be guaranteed by a system according to the prior art.

An active rectifier allows the DC voltage at the output of the active rectifier to be regulated, which was not possible with a passive rectifier of the prior art. This protects the elements of the DC bus, in particular, a capacitor or capacitors, as well as the power components in the system. In addition, the efficiency of the system is improved.

In a system of the prior art, an electronic control unit had no action on the passive rectifier of this system, but had an action only on the output inverter of the system.

The generator can be reversible. The active rectifier can be reversible by operating as an inverter providing a polyphase power supply to the generator.

Such a system operates as a power supply for an electrical network at the output of the system, but also for the generator, which provides it with a dual function and increases its possibilities of use.

As the system according to the present invention is reversible, this system can be used for an electrical supply of one or a plurality of on-board electrical networks at the output or conversely for a start of the turbomachine or a source of speed equivalent to a turbomachine.

Said controllable switch may be a transistor, an insulated gate bipolar transistor, a field effect transistor, or a metal-oxide semiconductor field effect transistor.

Each arm of the active rectifier may comprise at least two controllable switches. In other words, two controllable switches may be integrated into each of the arms of the active rectifier.

In a VSCF system with a passive rectifier of the prior art, the output inverter, with at least three arms, and possibly with as many arms as there are phases at the output, does not allow for the management of the neutral in the system.

Advantageously, the rectifier at the output of the generator and the generator do not suffer the impact of short circuits that may occur on the output polyphase electrical network and do not need to be oversized.

The management of the neutral is performed by the output inverter of the system. The modules of the inverter can be oversized to handle possible short circuits on the output side of the system to the external electrical network. The DC bus voltage can be 540 Volts.

An additional arm can be provided for the power electronics of the electronic control unit with more complex control.

The arm connected to the neutral can be configured to split the DC bus into two parts, each part of the DC bus comprising a capacitor. In other words, a capacitor may be positioned in each of the two parts of the DC bus.

The DC bus can be split into two portions of 270 volts each at the capacitive midpoint of the DC bus.

The management of the neutral is then carried out through the rectifier, the generator and/or output inverter of the system, with the inverter not requiring an additional arm.

The generator and rectifier can be sized to withstand short circuits.

The arm connected to the neutral starting from the DC bus can be connected to an arm connected to the neutral from the synchronous generator.

The arm connected to the neutral can be connected in the output inverter to an additional arm to the arms of said inverter respectively associated with a phase of the current, the additional arm comprising at least one controllable switch.

Generally speaking, for a system according to the present invention, the management of the power flow is ensured through control laws implemented in control cards of the electronic control unit and allowing to ensure:
the regulation of the DC bus voltage at a constant level,
the defluxing, if necessary, of the synchronous generator,
the generation of an on-board electrical network, advantageously with a voltage of each phase in relation to the neutral of 115 effective volts and a fixed frequency of 400 Hertz,
the management of the neutral of the electrical network,
the stability of the system, in particular after the insertion of the electromagnetic compatibility filter at the output of the system,
the failure management, with fault tolerant control laws, and
the reversibility of the VSCF system.

BRIEF DESCRIPTION OF THE FIGURES

The present invention will be better understood and further details, features and advantages of the present invention will become clearer from the following non-limiting example description, with reference to the attached drawings in which:

FIG. 1 schematically represents a VSCF system according to the prior art,

FIG. 2 schematically represents a VSCF system according to the present invention, FIG. 3 schematically represents a power circuit of a VSCF system of the present invention with active rectifier and management of the neutral starting from the output inverter of the system, FIG. 4 schematically represents the VSCF system of the present invention with active rectifier and management of the neutral starting from the inverter, FIG. 5 schematically represents a VSCF system according to the present invention with active rectifier and management of the neutral starting from the DC bus.

The elements having the same functions in the different embodiments have the same references in the figures.

DETAILED DESCRIPTION OF THE INVENTION

In the following description, reference is made to all FIGS. 1 to 5 taken in combination. When reference is made to a specific figure or figures, these figures are to be taken in combination with the other figures for the recognition of the designated numerical references.

In the active rectifier 3, only one controllable switch is referenced 6, but what is stated for this referenced controllable switch is stated for each controllable switch in the rectifier 3. The same is true in the inverter 5 for its controllable switches, only one of which is referenced 6, and for one of the two controllable switches 6a of the arm connected to the neutral 8.

Referring more particularly to FIGS. 2 to 5, the present invention relates to a VSCF system 1 delivering at the output a polyphase current of constant frequency from a synchronous generator 2, preferably with permanent magnets driven at variable speed. According to the invention, a polyphase current has at least three phases, so it is at least a three-phase current.

This system can act as a fixed frequency electrical generator via a variable speed polyphase synchronous machine and can be used in an aircraft, without this being limiting.

The fact that the generator 2 is driven at variable speed means that the frequency of the alternating current at the output of the generator 2 cannot be constant over time.

The rotor of a polyphase permanent magnet synchronous electric generator 2 with a number of phases greater than or equal to 3 is driven by a mechanical shaft, for example a shaft of a speed source, in particular a turbomachine, at variable rotational speeds. These rotational speeds depend on the operating regime of the turbomachine as a speed source and on the phase of flight of the aircraft when the turbomachine is on board the aircraft.

This variable speed drive of the generator 2 generates electromotive forces at its stator phases with varying electrical frequencies, given the varying rotational speed, i.e. the operating regime of the turbomachine.

In FIG. 2, the device, not shown in this figure, driving the generator 2 can be a rotating turbomachine and delivering a mechanical power Pm. The frequency of the output current of the generator 2 is variable and is referenced fv. The reference n indicates the number of current phases at the output of the generator 2.

In order to guarantee a constant frequency alternating current at the output of the system 1, the system 1 comprises successively, at the output of the generator 2, a rectifier 3 from alternating current to direct current, a direct current bus 4 and an inverter 5 from direct current to alternating current at the output of the system 1.

At the output of the inverter 5, the frequency of the electric current referred to as fc is substantially constant. The system 1 supplies electricity to an external electrical network or networks 12.

Thus, in a known way, the conversion to a fixed electrical frequency is ensured by the insertion of two converters, namely an active rectifier 3 and then an inverter 5, connected by a common direct current bus 4 between the phases of the generator 2 and the polyphase electrical output network 12, with a number of phases greater than or equal to 3.

The rectifier 3 at the output of the generator 2 converts the AC electrical signals at the output of the generator 2 into DC signals.

The output inverter 5 of the system 1 converts the DC bus voltage 4 into an AC current of a defined number of AC voltages, whereby the number of phases at the output of the system 1 can be different from the number of phases at the output of the generator 2 before the rectifier 3.

The output inverter 5 of the system 1 has at least as many arms as there are phases at the output electrical network 12 of the system 1.

An example of an embodiment of a voltage inverter 5 is shown in FIG. 3. In this figure, a three-phase network with an arm connected to the neutral 8 and an inverter 5 are chosen for simplicity of illustration. There is nothing to prevent the use of other voltage inverter topologies and/or polyphase AC distribution networks.

The presence of an intermediate DC bus 4 between the rectifier 3 and the inverter 5 allows the number of phases of the generator 2 to be decoupled from the number of phases of the electrical distribution network at the output of the system 1, these two number of phases may be equal or different.

The use of a passive rectifier 3 and an inverter 5 allows the generation of a fixed electrical frequency output current.

According to the present invention, in a previously described system 1, the rectifier is an active rectifier 3 comprising at least one arm for each phase of a polyphase current at the output of the generator 2.

Each arm comprises at least one controllable switch 6. Furthermore, the system 1 comprises an electronic control unit 7 driving the active rectifier 3 with first means for controlling said at least one controllable switch 6 of each arm.

The rectifier is said to be an active voltage rectifier 3 because it incorporates controllable switches 6 with at least one controllable switch 6 for each current phase at the output of the generator 2.

Different topologies of voltage rectifiers can meet the needs of the system 1. It is important that these rectifiers have at least as many arms as there are phases in the stator of the electrical generator 2.

A topology of an active voltage rectifier 3 usable in the context of the present invention without being limiting is shown in FIG. 3.

In the case of a reversible generator 2 that can also be used as an electrical machine as a motor, the active rectifier 3 can be reversible by operating as an inverter to provide a polyphase power supply to the generator 2.

This provides a power supply function performed by the system 1 in two opposite directions either to an external electrical network at the output of the inverter 5 of the system 1 or to the generator 2, the rectifier 3 at the output of the generator 2 then operating as an inverter to supply the generator 2 with alternating current.

The presence of a reversible active rectifier 3 allows the electronic control unit 7 to drive a power supply via the system 1 operating in the opposite direction to that normally used, so that the generator 2 can be supplied by the system 1 rather than the generator 2 supplying the system 1.

The operation of the generator 2 is no longer solely in current generator mode. This was not possible with a passive rectifier 3a according to the prior art previously shown in the FIG. 1.

The controllable switch(es) 6 of the rectifier 3 at the output of the generator 2 may be a transistor, an insulated gate bipolar transistor, a field effect transistor or a metal-oxide semiconductor field effect transistor, known in particular by the acronym IGBT or MOSFET. Other types of controllable switches 6 may also be implemented within the scope of the present invention.

In order to drive the active rectifier 3 but also the output inverter 5, the electronic control unit 7 may comprise means for monitoring a respective upstream and downstream voltage both for the active rectifier 3 and for the output inverter 5 of the system 1. The electronic control unit 7 may also comprise means for monitoring a current on each of the phases for both the active rectifier 3 and the inverter 5.

The electronic control unit 7 may also include second means for controlling the output inverter 5.

In FIGS. 3 to 5, the output inverter 5 comprises one arm per phase a, b, c of the polyphase alternating current at the output of the system 1, the non-limiting number of arms being three in these figures. The neutral of the phase is referenced n.

Each arm per phase a, b, c of the output inverter 5 may comprise at least one controllable switch 6 driven by the second controlling means of the electronic control unit 7, as shown in FIG. 2.

On the other hand, in a passive rectifier VSCF system 1a of the prior art, the output inverter 5, which has three arms as shown in FIG. 1, but which may have as many arms as there are output phases, does not allow the management of the neutral in the system 1a.

Referring to FIGS. 3 to 5, stator phases, shown in a non-limiting number of five and therefore pentaphase, of a synchronous generator 2 can be connected to the midpoints of five arms of an active rectifier 3 with two voltage levels.

In FIGS. 3 to 5, the phases at the output of the generator 2 are five and referenced a, b, c, d, e. The phases at the output of the inverter 5 are three and referenced a, b, c. The neutral phase through the neutralizing arm or arm connected to the neutral 8 is referenced n. In FIGS. 2, 4 and 5, DC means Direct Current and AC means Alternative Current.

The output inverter 5 of the system 1 or the DC bus 4 may include an arm connected to the neutral 8. In FIGS. 3 and 4, the arm connected to the neutral 8 extends from the system output inverter 5, while in FIG. 5, the arm connected to the neutral 8 extends from the DC bus 4 at a capacitive midpoint.

As shown in FIG. 5, the arm connected to the neutral 8 may split the DC bus 4 into two parts, whereby a capacitor 11a may be positioned in each of the two parts of the DC bus 4. In this case, the arm connected to the neutral 8 can be made to the capacitive midpoint of the DC bus 4, preferably at 270 volts. The DC bus 4 then comprises two capacitors 11a in series.

Still referring to FIG. 5, the arm connected to the neutral 8 starting from the DC bus 4 can be connected to an arm connected to the neutral 8a from the synchronous generator 2.

In FIG. 3, the arm connected to the neutral 8 can be connected in the output inverter 5 to an additional arm to the arms of the inverter 5 associated respectively with a phase a, b, c of the current, whereby the additional arm can comprise at least one controllable switch 6a, advantageously two controllable switches 6a, as shown in FIG. 3. In this case, the DC bus 4 comprises only one capacitor 11a.

The neutral of the electrical network can be managed in particular by a 3D-SVM strategy known as "Three Dimensional Space Vector Modulation".

In order to ensure this management of the neutral, the midpoint of the additional arm or arm connected to the neutral 8 can be connected to the midpoint of a star connection of the filter capacitors 11 at the output of the inverter 5 in the EMC filter 9. This also applies to an arm connected to the neutral 8 starting from the DC bus 4, as shown in FIG. 5.

In FIGS. 3 and 4, the DC bus 4 of the system 1 can be placed at the output of the active voltage rectifier 3 and at the input of an active inverter 5 for the output at two voltage levels having non-limiting four output arms, three of which are associated respectively with a phase a, b, c of the output current.

The fourth arm, which is the additional arm mentioned above, is used to manage the neutral of the electrical network by being an arm connected to the neutral 8.

Thus, for a three-phase network, which is the non-limiting case of this example of FIGS. 3 and 4, a voltage of each phase with respect to the neutral of 115 Volts RMS and a fixed frequency of 400 Hertz can be generated at the regulation points at the output of the system 1, advantageously at the output of a filter 9 of electromagnetic compatibility.

The EMC filter 9 may be dimensioned to filter out high frequency harmonics, for example multiples of 400 Hertz and harmonics related to a switching frequency, multiples of this switching frequency.

The EMC filter 9 may comprise an arm for each phase a, b, c of the polyphase current output from the system 1. Each arm of each phase a, b, c may comprise an inductor 10. A capacitor 11 may be mounted in a bypass of each arm downstream of the inductor 10 i.e., at a point on the arm closer to the output of the system 1 than the inductor 10.

As shown in FIGS. 3 to 5, the arm connected to the neutral 8 starting from either the DC bus 4 or the output inverter 5 of the system 1 may be connected to each bypass containing a capacitor 11 of the arms of phases a, b, c of the EMC filter 9.

The arm connected to the neutral 8 may also be filtered in the EMC filter 9 and may comprise an inductor, as shown in FIG. 3.

The invention is by no means limited to the described and illustrated embodiments which have been given only as examples.

The invention claimed is:

1. A system configured to deliver as output a polyphase current of constant frequency from a synchronous generator driven at variable speed, said system successively comprising, at the output of said generator an AC to DC rectifier, a DC bus and a DC to AC inverter for the output of said system, the output inverter of said system or the DC bus comprising an arm connected to the neutral, said output inverter further comprising one arm per phase of the polyphase alternating current at the output of said system, said rectifier being an active rectifier comprising at least one arm for each phase of a polyphase current at the output of said generator, each arm comprising at least one controllable switch, said system also comprising an electronic control unit configured to drive said active rectifier with first means for controlling said at least one controllable switch of each arm, said system being characterised in that the electronic control unit comprises means for monitoring a respective upstream and downstream voltage for the active rectifier and/or for the output inverter of said system and second means for controlling said output inverter, in that each arm per phase of said output inverter comprises at least one controllable switch configured to be driven by the second controlling means of the electronic control unit, and in that said system comprises an electromagnetic compatibility filter at the output of the output inverter of said system, said filter comprising an arm for each phase of the polyphase current at the output of said system, each arm of each phase comprising an inductor, a capacitor mounted in a bypass of each arm downstream of said inductor, the arm connected to the neutral being connected to each bypass of the arms of the phases of the EMC filter and in that the arm connected to the neutral is connected in the output inverter to an additional arm to the arms of said inverter associated respectively with a phase of the current, said additional arm comprising at least one controllable switch.

2. The system according to claim 1, wherein the generator is reversible, the active rectifier being reversible by operating as an inverter providing a polyphase power supply to said generator.

3. The system according to claim 1, wherein said at least one controllable switch is a transistor, an insulated gate bipolar transistor, a field effect transistor or a metal-oxide semiconductor field effect transistor.

4. The system according to claim 1, wherein each arm of the active rectifier comprises at least two controllable switches.

5. The system according to claim 1, wherein the arm connected to the neutral is configured to split the DC bus into two parts, each part of the DC bus comprising a capacitor.

6. The system according to claim 5, wherein the arm connected to the neutral starting from the DC bus is connected to an arm connected to the neutral starting from the synchronous generator.

7. The system according to claim 1, wherein the polyphase current has at least three phases, so it is at least a three-phase current.

8. The system according to claim 1, wherein the electronic control unit comprises means for monitoring a current on each of the phases for both the active rectifier and the inverter.

9. The system according to claim 1, wherein the neutral of the electrical network is managed by a 3D-SVM strategy known as "Three Dimensional Space Vector Modulation.

10. The system according to claim 1, wherein the EMC filter is dimensioned to filter frequency harmonics multiples of a switching frequency.

* * * * *